United States Patent [19]
Sykes

[11] Patent Number: 5,540,009
[45] Date of Patent: Jul. 30, 1996

[54] ICE FISHING RIG

[76] Inventor: Willard D. Sykes, 13090 182nd St. North, Marina On The St. Croix, Minn. 55047

[21] Appl. No.: 38,140
[22] Filed: Mar. 26, 1993
[51] Int. Cl.⁶ .............................. A01K 61/00; A01K 91/00
[52] U.S. Cl. .................................................. 43/4; 43/43.1
[58] Field of Search .......................... 43/4, 4.5, 43.1, 43/44.9, 17, 16

[56] References Cited

U.S. PATENT DOCUMENTS

| | | | |
|---|---|---|---|
| 2,700,238 | 1/1955 | Schrader | 43/17 |
| 2,883,784 | 4/1958 | Obernolte | 43/4 |
| 3,813,891 | 6/1974 | Wootten | 43/4 |
| 4,253,262 | 3/1981 | Johnson | 43/17 |
| 4,359,836 | 11/1982 | Yuji | 43/44.9 |
| 4,438,757 | 3/1984 | Anderson | 43/4 |
| 4,662,099 | 5/1987 | Stewart | 43/17 |
| 4,945,668 | 8/1990 | Keller | 43/17 |

Primary Examiner—P. Austin Bradley
Assistant Examiner—Chuck Y. Mah
Attorney, Agent, or Firm—Friederichs Law Firm

[57] ABSTRACT

An ice fishing rig for retarding reformation of ice and the method of using the same, the ice fishing rig having a heat supply joined to a heat dispensing shaft, an ice fishing line being fed through the heat dispensing shaft, and the heat dispensing shaft being floated adjacent the surface of water in an ice fishing hole.

10 Claims, 3 Drawing Sheets 5,540,009

1
ICE FISHING RIG

FIELD OF THE INVENTION

The present invention relates to ice fishing, and more particularly to a device for preventing the reformation of ice in an ice fishing hole.

BACKGROUND OF THE INVENTION

Ice fishing is popular sport, enjoyed by countless anglers worldwide. Typically, an angler drills or chops a hole through the ice overlying a body of water. The ice chunks are removed from the hole. Then a fishing line complete with a hook, sinker and bait is dropped into the hole. An angler in most situations will use a bobber. One problem commonly encountered while ice fishing is that of the water refreezing. Refreezing is a problem in at least two specific situations.

First, many anglers use slip bobbers. Slip bobbers are bobbers that are not fixedly attached to the line. Line is fed through a tube extending through the bobber. The bobber slides along the line between two predetermined points. At one of these points is a bobber stop, which determines how far away from the bait that the bobber can get. The second point is a sinker or the bait itself. The second point is only important in the sense that the angler wants the bobber to get close to the end of the line without the bobber falling off. When bobber fishing in deep water, the sliding ability of the slip bobber is a significant help to the angler retrieving line into a reel.

The fishing line slides through the channel in the slip bobber as line is brought into the reel. This channel comes into contact with water when the wet fishing line is pulled through the bobber. The water in the channel will freeze on days when the ambient temperature is below freezing. Ice inside the channel reduces or destroys the ability of slip bobbers to slide along the fishing line. This reformation of ice is a problem for the angler.

The second problem with refreezing of water is that the ice fishing hole can freeze over. When the hole freezes over, the bobber and/or the fishing line gets stuck in the ice. The freezing of the line or the bobber to the hole creates unnecessary resistance on the bait. The resistance can spook the fish and spoil the day of fishing. To solve this problem anglers routinely clean the ice out of the fishing hole. Colder days require more cleaning. Cleaning the ice from the hole is a burdensome chore for the angler, especially in the cold weather.

SUMMARY OF THE INVENTION

The present invention is an ice fishing rig for use in an ice fishing hole. The rig uses a heat source to effectively impede the reformation of ice. The rig includes a heating mechanism for supplying heat to impede the reformation of ice. The heating mechanism of the ice fishing rig may include a heat supplying mechanism and a heat dispensing mechanism. The ice fishing rig also includes a floating mechanism for maintaining the heating mechanism at the surface level of the water.

The heat supplying mechanism supplies heat to the heat dispensing mechanism. The heat supplying mechanism may be contained within the floating mechanism and may be selectively detachable therefrom. The heat supplying mechanism may further include a battery and wiring. The battery may be a low voltage battery. The wiring connects the battery to the heat dispensing mechanism.

2

The heat dispensing mechanism transfers heat from the heat supplying mechanism to water in an ice fishing hole. The heat dispensing mechanism may include a shaft. The shaft has an internal diameter sufficiently sized to allow an ice fishing line to pass therethrough. The shaft may be constructed from polypropylene plastic, metal or any substance that provides enough thermal conduction to maintain the nearby water in a liquid form.

The floating mechanism is joined to the heating mechanism such that the heating mechanism extends through a surface of water. The floating mechanism may be formed of a hollow polypropylene casing, styrofoam polystyrene plastic or any other buoyant material.

The present invention also includes the method of using the ice fishing rig. The method of using an ice fishing rig includes the following steps. First, a fishing line is fed through a heat dispensing shaft that has an internal diameter larger than the line. Second, the heat dispensing shaft is floated in water in an ice fishing hole. And third, heat from a heat supply is transferred to the heat dispensing shaft. It should be noted that the heat dispersing shaft can be preheated prior to feeding fishing line therethrough.

The method of the present invention may include some intervening steps. For instance, the fishing line may be fitted with a line stop. The line stop should have an external diameter larger than the internal diameter of the heat dispensing shaft. The line stop should be attached to the line at a point above the heat dispensing shaft. The method may also include the step of selectively detaching the heat supply from the heat dispensing shaft.

DETAILED DESCRIPTION OF THE PREFERRED EMBODIMENTS

Figure 1:
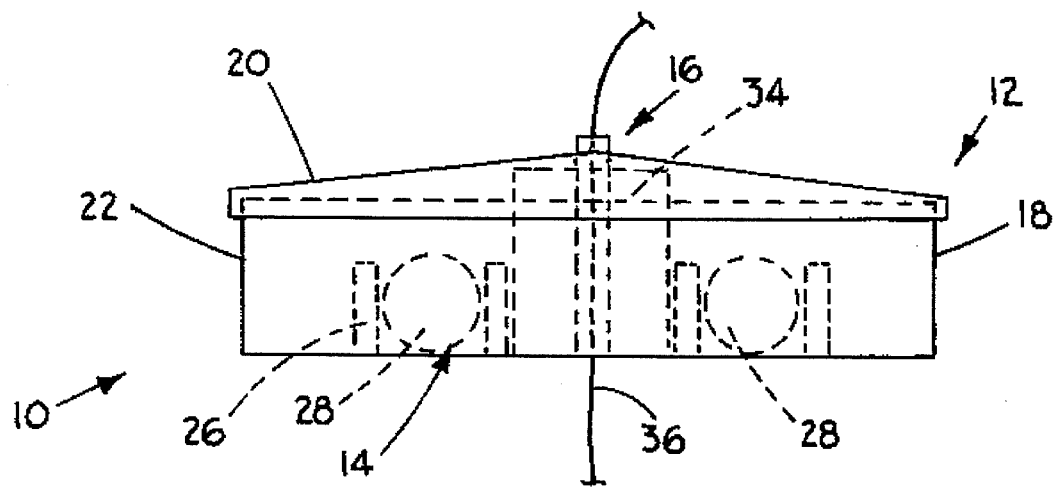
FIG. 1 is a side view, shown partially in fantom, of the first embodiment of the present invention.
Figure 2:
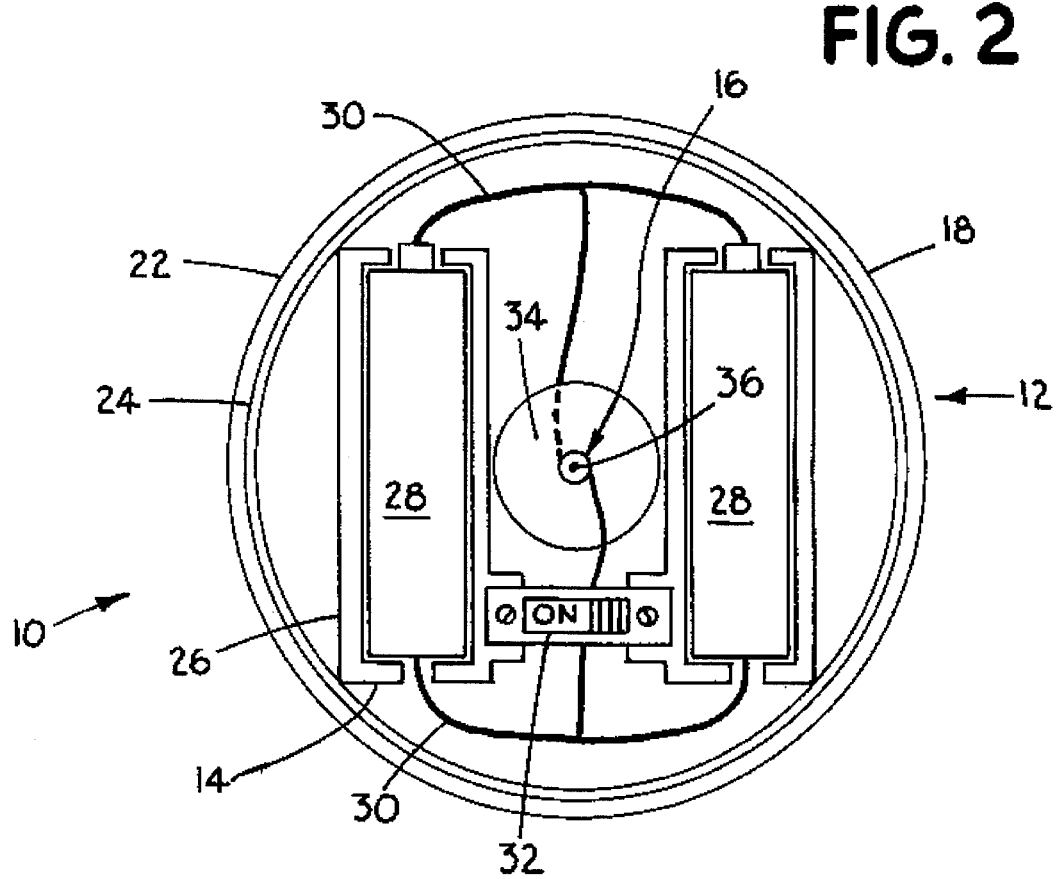
FIG. 2 is a top view of the first embodiment of the present invention.

The present invention prevents reformation of ice in an ice fishing hole as illustrated in FIGS. 1–5. The first embodiment of the present invention 10 includes a floating mechanism 12, a heat supplying mechanism 14, and a heat transferring mechanism 16 as shown in FIGS. 1 and 2. Each of these components will be discussed in order.

The floating mechanism 12 is a hollow casing 18 including a top 20 and bottom 22. The casing 18 may be injection molded from polypropylene plastic. Although shown circular in horizontal cross section, the casing 18 may have any shape in horizontal cross section including a rectangle, triangle, oval, or irregular shape. Likewise, the vertical cross section of the casing 18 may be of any shape. The top 20 of the casing 18 may form a releasable water tight seal with the bottom 22. Such a seal may utilize a rubber o-ring 24. The seal helps trap air inside the casing 18, which makes the casing buoyant. Yet, the seal may be releasable to install new batteries 28.

The heat supplying mechanism 14 includes a battery casing 26, batteries 28 wiring 30 and a switch 32. The battery casing 26 is attached to or integral with the bottom 22 of the floating mechanism 12. The battery casing 26 is sized to receive at least one battery 28. The battery 28 may be of any size or shape, however, it is contemplated that two AA 1.5 volt batteries will fit into the battery casing 26. A first end of wiring 30 connects the terminal ends of the batteries 28 to the heat transferring mechanism 16. The wiring 30 passes through a switch 32 which is used to shut off the electrical flow when heat from the heat supply mechanism 14 is not needed. The wiring 30 has a second end which attaches to the heat dispensing mechanism 16. Preferably the wiring is a stable ohm 650 material coiled with two torshioned legs and slipped over the heat transferring mechanism 16.

The heat dispensing mechanism 16 is connected to the heat supplying mechanism 14 via the wiring 30. The wiring 30 is tightly coiled around the heat transferring mechanism 16. Insulating material 34, such as styrofoam polystyrene plastic, is disposed about the coiled wiring 30. The insulating material 34 causes the heat to transfer to the heat transferring mechanism 16 instead of to other internal components of the device 10. Preferably, the insulating material 34 is less thermally conductive than the heat transferring mechanism 16. A fishing line 36 is shown extending through the heat transferring mechanism 16.

Figure 3:
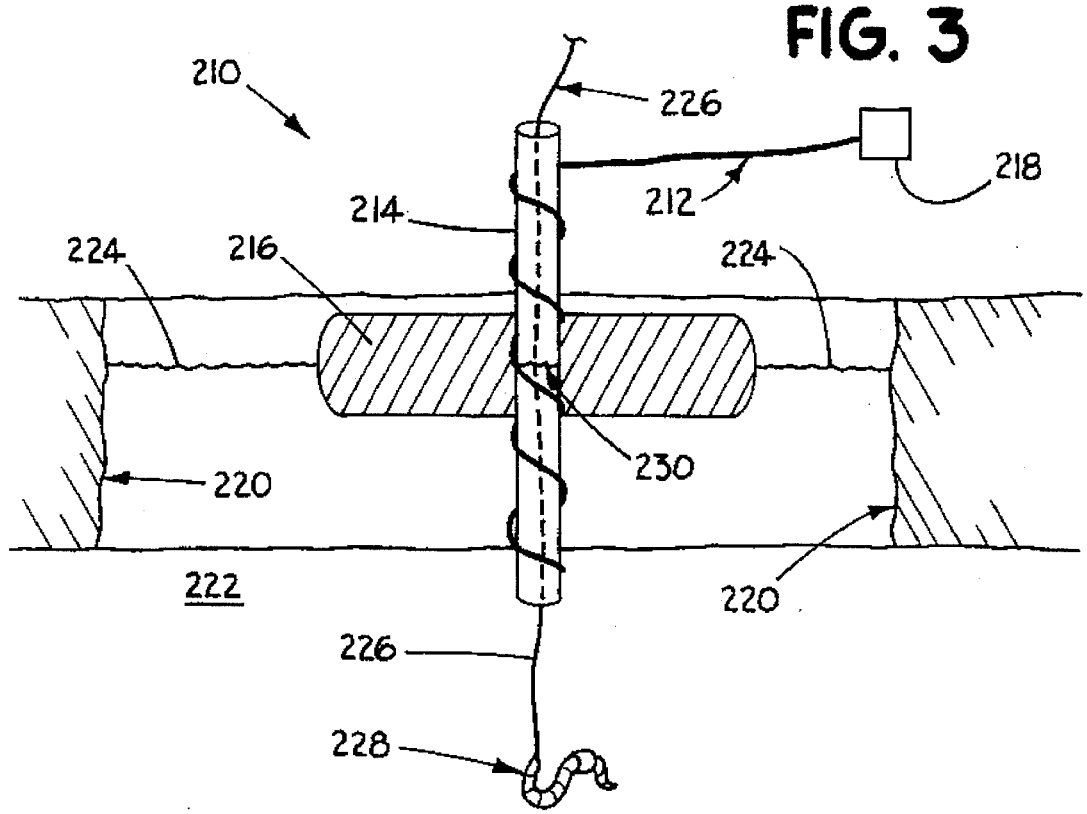
FIG. 3 is a cross sectional view of the second embodiment of the present invention when placed in preformed ice fishing hole.
Figure 4:
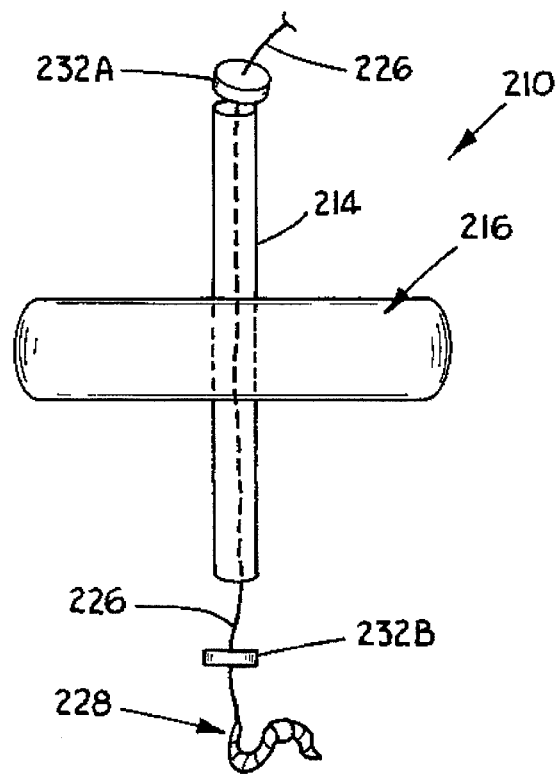
FIG. 4 is a side view of the second embodiment of the present invention in which a bobber stop is used to maintain the fishing line's position.
Figure 5:
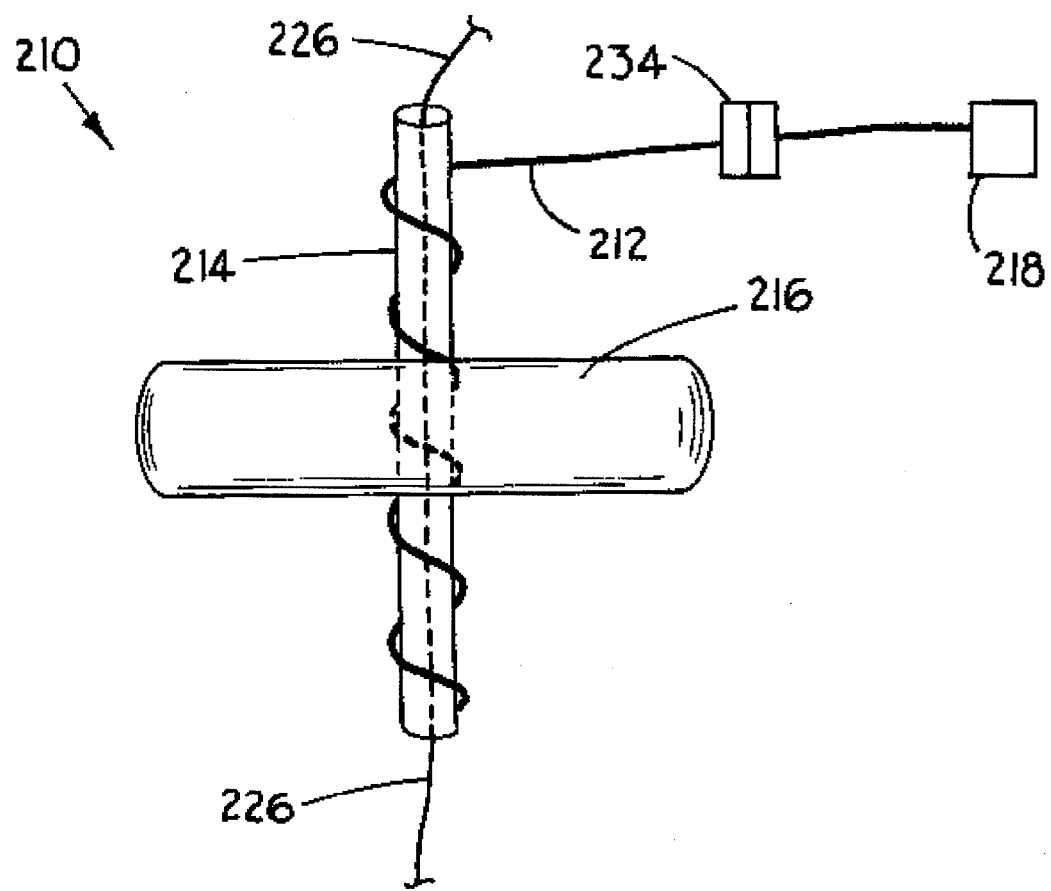
FIG. 5 is a side view of the second embodiment of the present invention shown with a plug device to easily detach the power source from the heat dispersing tubing.

The second embodiment of the ice fishing rig 210, shown in FIGS. 3–5, includes a heat source 212, a heat dispensing tubing 214 and floating material 216. The heat source 212 may be a wire number connected to a power source 218. The power source 218 may be a low voltage battery or a high voltage battery such as a car battery. The heat source 212 is thermally connected to the heat dispensing tubing 214. The heat dispensing tubing 214, may be made of a material which easily conducts heat such as copper or any other material with thermally conductive properties.

The heat dispensing tubing 214 is supported by the floating material 216. The floating material 216 may surround the heat dispensing tubing 214 to maintain enough frictional contact with the tubing 214 such that the tubing 214 cannot be easily separated from the floating material 216. The floating material 216 can be constructed of styrofoam polystyrene plastic or any other material with a buoyancy capable of maintaining the heat dispensing tubing 214 at the water surface level 224 of the ice fishing hole.

As shown in FIG. 4, the fishing line 226 may have beads 232A and 232B or other apparatus attached above and/or below the heat dispensing tubing 214. Bead 232A may prevent the fishing line 226 from dropping the bait 228 below a certain level. The bead 232A may also serve a "warning" function by forcing the fishing rig 210 to drop below the water level surface 224 after a fish is caught. The bead 232B may prevent the bait 228 and therefore anything attached to the bait 228 from contacting the bottom edge of the heat dispensing tubing 214 when the fishing line 226 is lifted or reeled upwards. If bead 232A or 232B is used, the internal diameter of the heat dispensing tubing 214 should be smaller than the external diameter of either bead 232A, 232B.

As shown in FIG. 5, the heat source 212 may be selectively removable from the heat dispensing tubing 214 by a plug mechanism 234. With this configuration, the heat source 212 may easily be disconnected from the heat dispensing tubing 214 prior to lifting or reeling the ice fishing rig 210 out of the water 222.

In use, a hole is created in the ice 220. Due to the density of ice, water 222 will fill up the hole to a level 224 below the top surface of the ice 220. Prior to placing the fishing rig 210 into the water 222, fishing line 226 is strung through the heat dispensing tubing 214. At one end of the fishing line 226 can be a hook, bait, or other fish catching apparatus 228. The opposite end of the fishing line 226 will be connected to a fishing pole (not pictured).

With the fishing line 226 properly orientated, the entire fishing rig 210 is placed in the hole on top of the water 222. The weight of the heat dispensing tubing 214 and the buoyancy of the floating material 216 is such that the fishing rig 210 floats at the top of the water level 224 with the bait 228 suspended below the water level 224. With the heat source 212 properly connected to a power source 218, a uniform heat is applied across the heat dispensing tubing 214. This in turn prevents any ice from reforming within the heat dispensing tubing 214. Therefore, the water 230 surrounding the fishing line 226 will not freeze. When a fish is caught on the hook 228, the angler simply reels in the fishing line 226 and lifts the fish and the fishing rig 210 out of the hole.

Ice may form at the waters surface level 224 between the floating material 216 and ice edges 220. This phenomena, however, will not effect the water 230 surrounding the fishing line 226. Simply stated, the fishing line 226 will at all times be freely movable within the heat dispensing tubing 214. To prevent the fishing rig 210 from freezing to the ice 220 surrounding the hole, heat may be conducted to the external surface of the fishing rig 210 in a manner similar to the transfer of heat to the heat dispensing tubing 214.

Although the present invention has been described with reference to preferred embodiments, workers skilled in the art will recognize that changes may be made in form and detail without departing from the spirit and scope of the invention.

What is claimed is:

1. An ice fishing rig, said rig comprising:

shaft means for slidably receiving fishing line;

heating means for supplying heat to impede the formation of ice in said shaft means, said heating means comprising heat supplying means for supplying heat and heat dispensing means for transferring heat from said heat supplying means to water within the shaft; and floating means for maintaining said heating means at a water surface level.

2. The rig of claim 1, wherein said heat supplying means further comprises:

a battery; and wiring, said wiring connecting said battery to said heat dispensing means.

3. The rig of claim 1, wherein said shaft is substantially contained within said floating means.

4. The rig of claim 3, wherein said shaft is constructed from metal.

5. The rig of claim 1, wherein said floating means is joined to said heating means such that said heating means extends through a surface of water.

6. The rig of claim 1, wherein said floating means is formed of polystyrene plastic.

7. The rig of claim 1 wherein said heat supplying means is selectively detachable from said heat dispensing means.

8. A method of using an ice fishing rig, comprising the steps of:

feeding a fishing line through a heat dispensing shaft, said shaft having an internal diameter larger than said line;

floating said heat dispensing shaft in water in an ice fishing hole; and supplying heat from a heat supply to said heat dispensing shaft.

9. The method of claim 8, further comprising the steps of:

fitting said fishing line with a line stop having an external diameter larger than the internal diameter of said heat dispensing shaft, said line stop being attached to the line at a point above said heat dispensing shaft.

10. The method of claim 8, further comprising the step of:

selectively disconnecting said heat supply from said heat dispensing shaft.

* * * * *